United States Patent [19]

Gugelmeyer et al.

[11] Patent Number: 5,276,752
[45] Date of Patent: Jan. 4, 1994

[54] FIBER OPTIC CONNECTOR SYSTEM

[75] Inventors: Robert J. Gugelmeyer, Naperville; Fred L. Krehbiel, Chicago, both of Ill.

[73] Assignee: Molex Incorporated, Lisle, Ill.

[21] Appl. No.: 921,884

[22] Filed: Jul. 29, 1992

[51] Int. Cl.⁵ .................................................. G02B 6/32
[52] U.S. Cl. ......................................... 385/69; 385/55; 385/76; 385/86
[58] Field of Search ........................ 385/55, 60, 62, 69, 385/70, 72, 76, 77, 78, 86, 92, 81

[56] References Cited

U.S. PATENT DOCUMENTS

| | | | |
|---|---|---|---|
| 4,173,389 | 11/1979 | Curtis | 385/78 X |
| 4,553,814 | 11/1985 | Bahl et al. | 385/78 X |
| 4,675,136 | 6/1987 | Calvet et al. | 264/1.5 |
| 4,697,870 | 10/1987 | Richards | 385/78 X |
| 4,740,052 | 4/1988 | Schrott et al. | 385/59 X |
| 4,741,590 | 4/1988 | Caron | 385/60 |
| 4,812,007 | 3/1989 | Lukas | 385/69 X |
| 4,813,760 | 3/1989 | Tanaka et al. | 385/69 X |
| 4,898,446 | 2/1990 | Hinckley | 385/72 |
| 4,923,272 | 5/1990 | Cuda | 385/55 X |
| 5,091,990 | 2/1992 | Leung et al. | 385/81 |
| 5,101,463 | 3/1992 | Cubukciyan et al. | 385/72 |
| 5,121,455 | 6/1992 | Palecek | 385/69 |
| 5,129,023 | 7/1992 | Anderson et al. | 385/70 |
| 5,179,607 | 1/1993 | Sellers et al. | 385/70 |

*Primary Examiner*—Brian Healy
*Attorney, Agent, or Firm*—A. A. Tirva

[57] ABSTRACT

A fiber optic connector system includes male and female mating connectors for interconnecting a pair of optical fibers each having a central core and an outer jacket. Each connector includes a housing adapted for receiving an end of one of the optical fibers and for mating with the other connector. Each connector housing is a plastic structure overmolded about the outer jacket of its respective optical fiber in an area at the end of the fiber. The outer jacket of the fiber has circumferential grooves into which the overmolded material of the connector housing extends for axially retaining the overmolded housing on the fiber. A band-like locking clip surrounds telescoped portions of the male and female connectors. The locking clip has a radially inwardly projecting locking tab extending into aligned apertures in the telescoped mating portions when the connectors are mated.

3 Claims, 3 Drawing Sheets

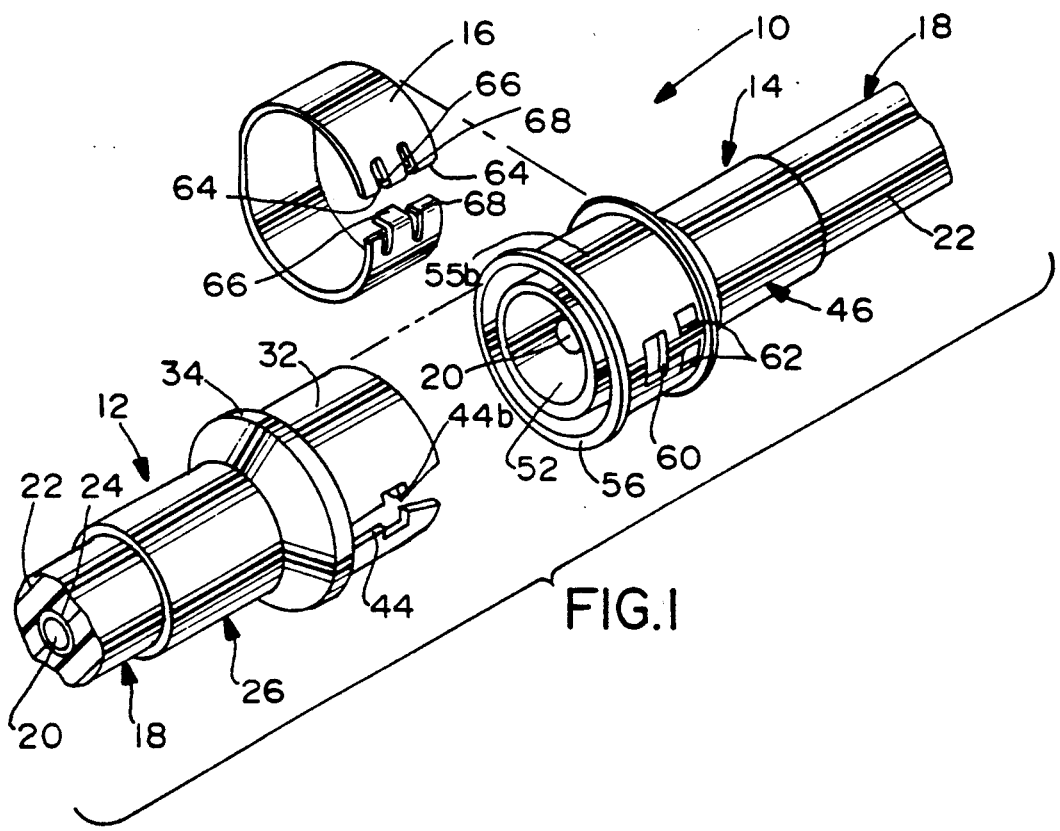
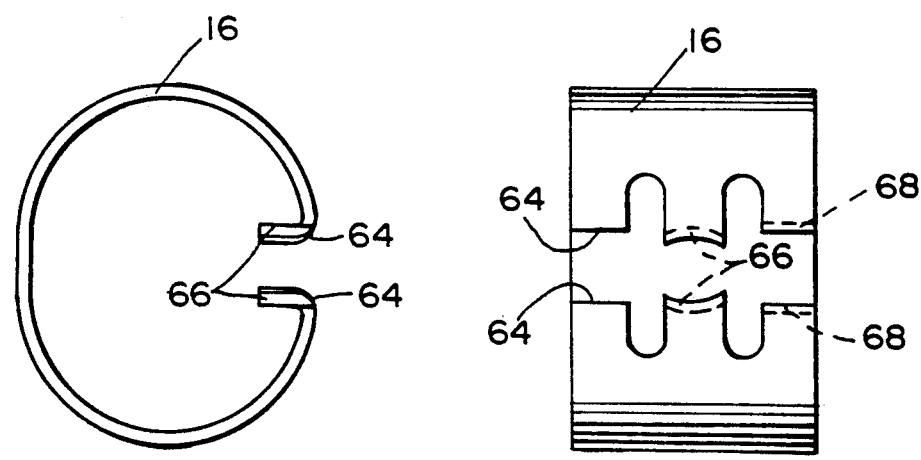

FIBER OPTIC CONNECTOR SYSTEM

FIELD OF THE INVENTION

This invention generally relates to the art of electrical connectors and, particularly, to a fiber optic connector system for optical fibers.

BACKGROUND OF THE INVENTION

In the optical fiber art, lightguide fibers are used in optical transmission systems wherein the fibers are connected end-to-end to transfer light therebetween. The fibers usually are terminated in connectors which center the fibers to provide low insertion losses. The connectors are coupled together so that their encapsulated fibers connect or abut end-to-end.

Typical optical fibers that are used in the telecommunications art are fabricated of glass and have diameters on the order of approximately 100 microns. Appropriate connectors for such optical fibers usually include a connector body or housing, a forwardly projecting ferrule of ceramic or other rigid material, and a connecting member such as a coupling ring for coupling a connector to a complementary connector. The fiber projects slightly from the distal end of the ferrule. The ferrule also might be inserted within an end of a precision sleeve which aligns or centers the ferrule and thus the fiber. Because of the small size of the optical fibers, such ferrules and sleeves must be very accurate or precision manufactured to ensure that a pair of fibers which are connected end-to-end are coaxially aligned to minimize light transmission losses.

On the other hand, fiber optic connector systems are used in less costly environments for interconnecting optical fibers which are used to transmit light primarily for the purpose of illumination. Fibers used in such environments often are fabricated of plastic and have diameters on the order of approximately 5,000 microns. Therefore, the accuracy required for connecting small fibers in environments such as telecommunications systems is not required. Yet, optical fiber connector systems in these environments continue to be quite complex and unduly expensive. There is a definite need for a connector system which is accurate, inexpensive and which will enable the ends of a pair of lightguide fibers to be connected end-to-end to minimize transmission losses of light through the interconnection.

This invention is directed to satisfying that need and to solve the problems of providing unduly complex and expensive connector systems in lightguide illumination environments.

SUMMARY OF THE INVENTION

An object, therefore, of the invention is to provide a new and improved fiber optic connector system which is extremely simple and very cost effective.

In the exemplary embodiment of the invention, the fiber optic connector system is designed for interconnecting a pair of optical fibers end-to-end, each fiber having a central core, a teflon sleeve and an outer jacket, and the connector system including a pair of mating connectors. However, the invention contemplates a single connector according to the design of the invention and mateable with an appropriate complementary device.

Therefore, the invention contemplates that the fiber optic connector system include one or more connectors having a housing adapted for receiving an end of an optical fiber and for mating with a complementary connector device, such as a housing of a complementary connector. The invention contemplates that the housing comprise a plastic structure which is overmolded about the outer jacket of the optical fiber in an area at the end thereof and exposing the central core of the fiber. The invention encompasses both the connector and a method of connection.

As disclosed herein, generally, the outer jacket and the overmolded housing include complementary interengaging retaining means for axially retaining the overmolded housing on the jacket. Specifically, the retaining means are illustrated in the form of circumferential grooves about the outer jacket and into which the material of the overmolded housing projects.

The invention further contemplates means for locking a pair of connectors of the character described in mated condition. Specifically, the connector system is disclosed herein to include male and female mating connector devices each including a housing overmolded about the outer jacket of an optical fiber at a respective end thereof. The overmolded housings of the male and female connector devices include telescoped mating portions. A locking clip interengages with the telescoped mating portions to hold the connector devices in mated condition. More particularly, the telescoped mating portions have aligned apertures when the connector devices are mated. The locking clip is a band-like member and has at least one locking projection extending into the aligned apertures.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the fiber optic connector system of the invention;

FIG. 6 is a side elevational view, on an enlarged scale, of the locking clip of the system;

FIG. 7 is an end elevational view of the locking clip of FIG. 6; and

DETAILED DESCRIPTION OF THE PREFERRED EMBODIMENT

Figure 2:
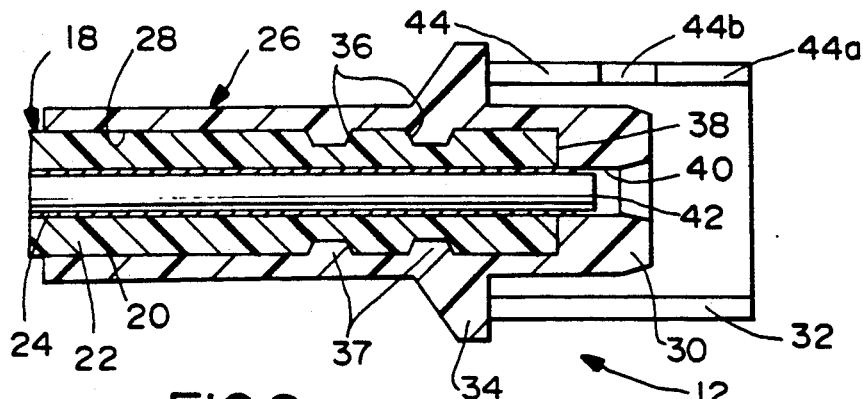
FIG. 2 is an axial section through the male connector of the system terminated to the end of an optical fiber.

Referring to the drawings in greater detail, and first to FIG. 1, a fiber optic connector system, generally designated 10, according to the invention is shown to include a pair of mating connector devices, specifically a male connector, generally designated 12, and a female connector, generally designated 14, along with a locking ring 16 which is used to hold the male and female connectors in mated condition. The connectors are adapted for terminating a pair of optical fibers, generally designated 18, with each fiber including a central core 20 and an outer jacket 22. The core and the jacket may be fabricated of plastic material. The fiber also includes a cylindrical strength member, such as a teflon sleeve 24, sandwiched between the central core and the outer jacket.

Figure 3:
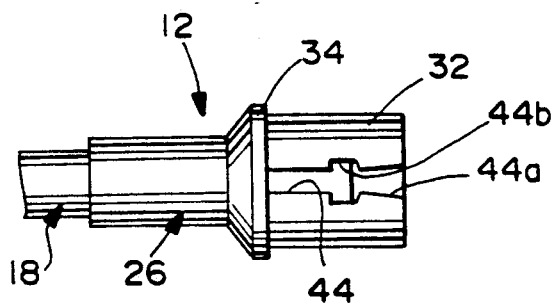
FIG. 3 is a side elevational view, on a reduced scale, of the male connector.

More particularly, referring to FIGS. 2 and 3 in conjunction with FIG. 1, male connector 12 includes a one-piece housing, generally designated 26, adapted for receiving an end of one of the optical fibers 18. In its finished form, housing 26 defines a central bore 28 which encapsulates the optical fiber, a male plug portion 30 projecting beyond the end of the optical fiber, a cylindrical portion 32 radially spaced from and projecting beyond the end of the male plug portion, and a radially outwardly projecting circumferential flange portion 34. The invention contemplates that housing 26 be provided in the form of a plastic structure which is overmolded about outer jacket 22 of the optical fiber in an area at the end thereof, as shown.

In addition, in order to facilitate interconnecting housing 26 with outer jacket 22 of the optical fiber, generally, complementary interengaging retaining means are provided between the outer jacket and the overmolded housing for axially retaining the overmolded housing on the jacket. More particularly, a plurality of circumferential grooves 36 are formed in the outer surface of outer jacket 22. The grooves may be formed by scoring, for instance. Therefore, the plastic material of housing 26 flows into grooves 36, as at 37, during the overmolding process whereby by the overmolded housing not only encapsulates the optical fiber but is axially retained thereon.

It can be seen best in FIG. 2 that the overmolded housing is molded over a distal end of the outer jacket, as at 38, and defines a bore section 40 coincident with and exposing a distal end 42 of central core 20 of the optical fiber within the bore section. Lastly, as best seen in FIGS. 1 and 3 and for purposes described hereinafter, cylindrical portion 32 of overmolded housing 26 includes an axial slot 44 which includes an outwardly diverging mouth 44a and an enlarged aperture area 44b.

Figure 4:
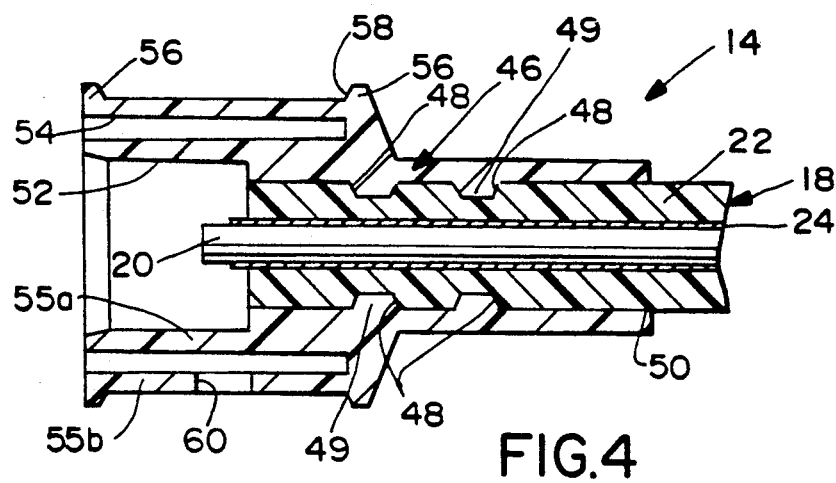
FIG. 4 is an axial section through the female connector of the system terminated to the end of an optical fiber.
Figure 5:
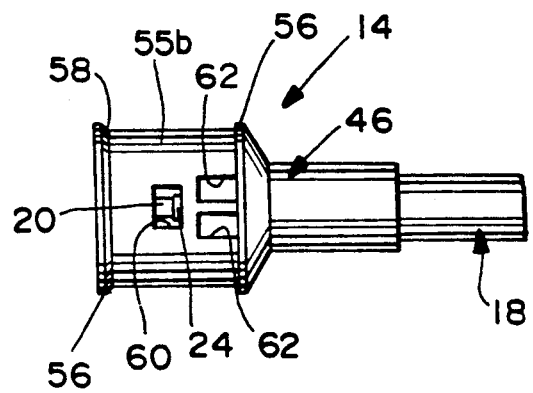
FIG. 5 is a side elevational view, on a reduced scale, of the female connector.

Referring to FIGS. 4 and 5 in conjunction with FIG. 1, female connector 14 is fabricated similar to male connector 12, except for its configuration as a female component for mating with the male connector. More particularly, female connector 14 is provided as a one-piece housing, generally designated 46, which is overmolded about the outer jacket 22 of the optical fiber shown. Again, the outer jacket is formed with circumferential grooves 48 into which the overmolded plastic material of housing 46 extends, as at 49, to provide complementary interengaging retaining means for axially retaining the overmolded housing on the jacket. Therefore, in its finished form, the overmolded housing defines a central bore 50 for encapsulating the optical fiber.

Overmolded housing 46 of female connector 14 is molded to define a socket 52 for receiving male plug portion 30 of male connector 12. The housing further includes an annular or cylindrical recess or groove 54 for receiving cylindrical portion 32 of the male connector. The recess is formed between inner and outer cylindrical portions 55a and 55b, respectively, of the housing. It can be seen that central core 20 of the optical fiber projects into socket 52. Still further, overmolded housing 46 of female connector 14 includes a pair of radially outwardly projecting, circumferential flanges 56 which define a fairly wide groove or channel 58 therebetween and encircling the mating end of the housing.

Lastly, as best seen in FIGS. 1 and 5 and for purposes described below, overmolded housing 46 of female connector 14 includes an aperture 60 which is aligned with aperture area 44b of housing 26 of male connector 12 when the male and female connectors are mated, along with a pair of other apertures or windows 62 spaced axially inwardly of aperture 60.

Referring to FIGS. 6 and 7 in conjunction with FIG. 1, as stated above, fiber optic connector system 10 includes locking clip 16 which is interengageable with the male and female connector housings to hold the connectors in mated condition. More particularly, locking clip 16 is in the form of a band-like member as is best seen in FIGS. 1 and 7. The locking clip is axially split to define a pair of opposing edges 64. The clip is fabricated of resilient material, such as metal or the like, whereby the clip can be expanded for mounting onto female connector 14, as described below, and then spring back into a locking position. The locking clip has a pair of locking projections or tabs 66 projecting radially inwardly from edges 64 for positioning in aperture 60 of female connector housing 46. The clip further has a pair of retaining tabs 68 projecting radially inwardly for insertion into windows or apertures 62 of female connector housing 46. In assembly, resilient band-like locking clip 16 is expanded so as to ride over the left-hand (as viewed in the drawings) flange 56 of female connector housing 46 so that the locking clip can be positioned within channel 58. When so positioned, locking tabs 66 project through aperture 60 and retaining tabs 68 project through apertures 62 in the housing. Locking tabs 66, as will be seen in relation to FIG. 8, project entirely through aperture 60 so that, when male connector 12 is mated with female connector 14, the locking tabs ride into mouth 44a of slot 44 in cylindrical portion 32 of male housing 26. The mouth converges axially inwardly and draws the locking tabs toward each other, whereupon the locking tabs will snap back outwardly into enlarged aperture area 44b of slot 44 to hold the male and female connectors together both axially and radially.

Figure 8:
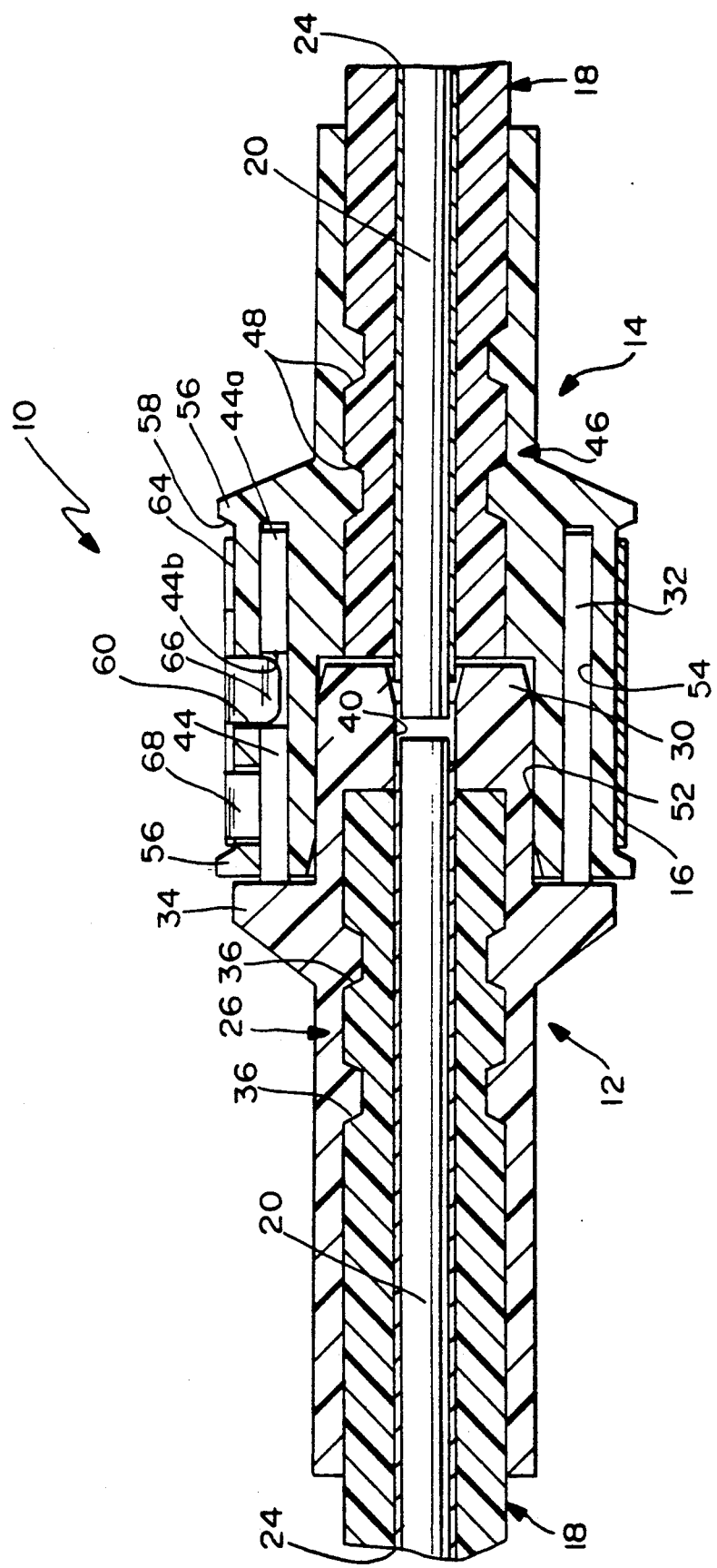
FIG. 8 is an axial section through the fiber optic connector system of the invention, with the male and female connectors fully mated.

FIG. 8 shows male connector 12 and female connector 14 of fiber optic connector system 10 in fully mated condition. It can be seen that male plug portion 30 of the male connector is inserted into socket 52 of the female connector. Cylindrical portion 32 of male connector 12 also can be seen inserted into recess or groove 54 of the female connector to define telescoped portions of the mated connectors. When so mated, it can be seen that the central cores 20 of optical fibers 18 are in axial alignment.

FIG. 8 also shows that aperture 60 in the overmolded housing of female connector 14 is in alignment with enlarged aperture area 44b of slot 44 in the cylindrical portion 32 of the overmolded male connector housing. Therefore, locking tabs 66 project through both the aligned aperture means in the respective overmolded housing to hold the male and female connectors in both circumferential and axial mated condition.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a fiber optic connector system for an optical fiber having a central core and an outer jacket, including a connector housing adapted for receiving an end of the optical fiber and for mating with a complementary connector device, the improvement wherein said system includes male and female mating connector devices each including a housing overmolded about the outer jacket of an optical fiber at a respective end thereof, the overmolded housings of the male and female connector devices include telescoped mating portions, said telescoped mating portions have aligned apertures when the connector devices are mated, and including a locking clip interengageable with the telescoped mating portions to hold the connector devices in mated condition wherein said locking clip comprises an axially split circumferential band-like member having a pair of locking projections on opposing edges of the band-like member at the split in the band extending into the aligned apertures.

2. In a fiber optic connector system as set forth in claim 1, wherein the outer jacket and the overmolded housing include complementary interengaging retaining means for axially retaining the overmolded housing on the fiber.

3. In a fiber optic connector system as set forth in claim 2, wherein said retaining means comprise circumferential groove means in the outer jacket.

* * * * *